(12) United States Patent
Siewert (10) Patent No.: US 7,464,689 B2
(45) Date of Patent: Dec. 16, 2008

(54) METHOD AND APPARATUS FOR CONTROLLING FUEL INJECTION INTO AN ENGINE

(75) Inventor: Robert M. Siewert, Birmingham, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/535,520

(22) Filed: Sep. 27, 2006

(65) Prior Publication Data

US 2007/0079798 A1  Apr. 12, 2007

Related U.S. Application Data

(60) Provisional application No. 60/725,692, filed on Oct. 12, 2005.

(51) Int. Cl.
*F02B 3/00* (2006.01)
(52) U.S. Cl. .................... 123/299; 123/478
(58) Field of Classification Search ............ 123/27 R, 123/294, 299, 300, 446
See application file for complete search history.

(56) References Cited

U.S. PATENT DOCUMENTS

| 3,792,692 | A |   | 2/1974  | Kiley |  |
|---|---|---|---|---|---|
| 4,883,032 | A | * | 11/1989 | Hunter et al. | 123/256 |
| 5,231,962 | A | * | 8/1993  | Osuka et al. | 123/299 |
| 5,265,562 | A |   | 11/1993 | Kruse |  |
| 5,740,775 | A |   | 4/1998  | Suzuki |  |
| 6,382,177 | B1 | * | 5/2002  | Saito | 123/299 |
| 6,470,849 | B1 | * | 10/2002 | Duffy et al. | 123/299 |
| 6,491,016 | B1 | * | 12/2002 | Buratti | 123/299 |
| 6,691,671 | B2 |   | 2/2004  | Duffy et al. |  |
| 6,705,277 | B1 |   | 3/2004  | Mgee |  |
| 6,725,829 | B2 | * | 4/2004  | Kataoka et al. | 123/299 |
| 6,840,211 | B2 | * | 1/2005  | Takahashi | 123/299 |
| 6,990,949 | B2 | * | 1/2006  | Kataoka et al. | 123/299 |
| 7,035,728 | B2 | * | 4/2006  | Manzone et al. | 701/103 |
| 2005/0268883 | A1 |   | 12/2005 | Sobotowski et al. |  |

OTHER PUBLICATIONS

Tow, T.C., et al., Reducing Particulate and NOx Emission by using Multiple Injections in a Heavy Duty DI Diesel Engine, SAE Tech Paper, 1994, #940897, SAE, Warrendale, PA, US.
Nakada, T., et al., Emission Control for the Duramax 6600 V8 Diesel Engine, SAE Tech Paper, 2000, #2000-01-3513, SAE, Warrendale, PA, US.
Ohishi, K., et al., The New Common Rail Fuel System for the Duramax 6600 V8 Diesel Engine, SAE Tech Paper, 2001, #2001-01-2704, SAE Warrendale, PA, US.
Kerekas, J., et al., The Design Concept of the Duramax 6600 Diesel Engine, SAE Tech Paper, 2001, #2001-01-2703, SAE, Warrendale, PA, US.

\* cited by examiner

*Primary Examiner*—Stephen K Cronin
*Assistant Examiner*—Arnold Castro (57) ABSTRACT

A method for controlling fuel injection into a direct injection, compression-ignition internal combustion engine is provided. The engine preferably comprises a diffusion-combustion engine equipped with a fuel-injection system comprising a high-pressure fuel system and a plurality of fuel injectors each adapted to inject fuel directly into a combustion chamber of the engine and a controller. The controller is adapted to monitor engine operation and an operator torque request, and determine a quantity of fuel to inject into one of the combustion chambers during a combustion cycle. Each fuel injector is actuated to selectively execute one of one, two, and three fuel injection events to deliver the determined quantity of fuel to the combustion chamber during the combustion cycle.

15 Claims, 7 Drawing Sheets

METHOD AND APPARATUS FOR CONTROLLING FUEL INJECTION INTO AN ENGINE

CROSS-REFERENCE TO RELATED APPLICATIONS

This application claims priority from U.S. Provisional Application No. 60/725,692 filed Oct. 12, 2005, entitled TWO-STAGE DIESEL COMBUSTION FOR REDUCED PARTICULATE EMISSIONS.

TECHNICAL FIELD

This invention pertains generally to internal combustion engines, and more specifically to fuel injection and combustion in a direct-injection internal combustion engine.

BACKGROUND OF THE INVENTION

Manufacturers of compression-ignition engines face increasingly stringent emissions standards in the future, including reductions in allowable levels of nitrides of oxygen ('$NO_x$') and particulate matter ('PM'). Broadly speaking, reducing emissions is achieved by reducing engine-out emissions, or by converting engine-out emissions to harmless gases using some form of exhaust gas aftertreatment, including converters, traps, or afterburners. Systems and methods to reduce engine-out emissions can include systems which premix fuel and air before entrance to the combustion chamber.

Achieving low emissions levels is especially challenging at high-load engine operating conditions. Known fuel/air premixing concepts are able to achieve low $NO_x$ and PM emissions at low engine load levels. However, such systems are often not operable during higher engine load operation due to excessive combustion noise, among other problems.

Therefore, there is a need for improved operation of a compression-ignition engine to address the aforementioned concerns.

SUMMARY OF THE INVENTION

In accordance with an embodiment of the invention, there is provided a method for controlling fuel injection into a direct injection, compression-ignition internal combustion engine. The engine preferably comprises a diffusion-combustion engine equipped with a fuel-injection system comprising a high-pressure fuel system and a plurality of fuel injectors each adapted to inject fuel directly into a combustion chamber of the engine and a controller. The controller is adapted to monitor engine operation and an operator torque request, and determine a quantity of fuel to inject into each of the combustion chambers during a combustion cycle. Each fuel injector is actuated to selectively execute one of one, two, and three fuel injection events to deliver the determined quantity of fuel to the combustion chamber during the combustion cycle.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, an embodiment of which is described and illustrated in the accompanying drawings which form a part hereof, and wherein.

DETAILED DESCRIPTION OF AN EMBODIMENT OF THE INVENTION

Figure 1:
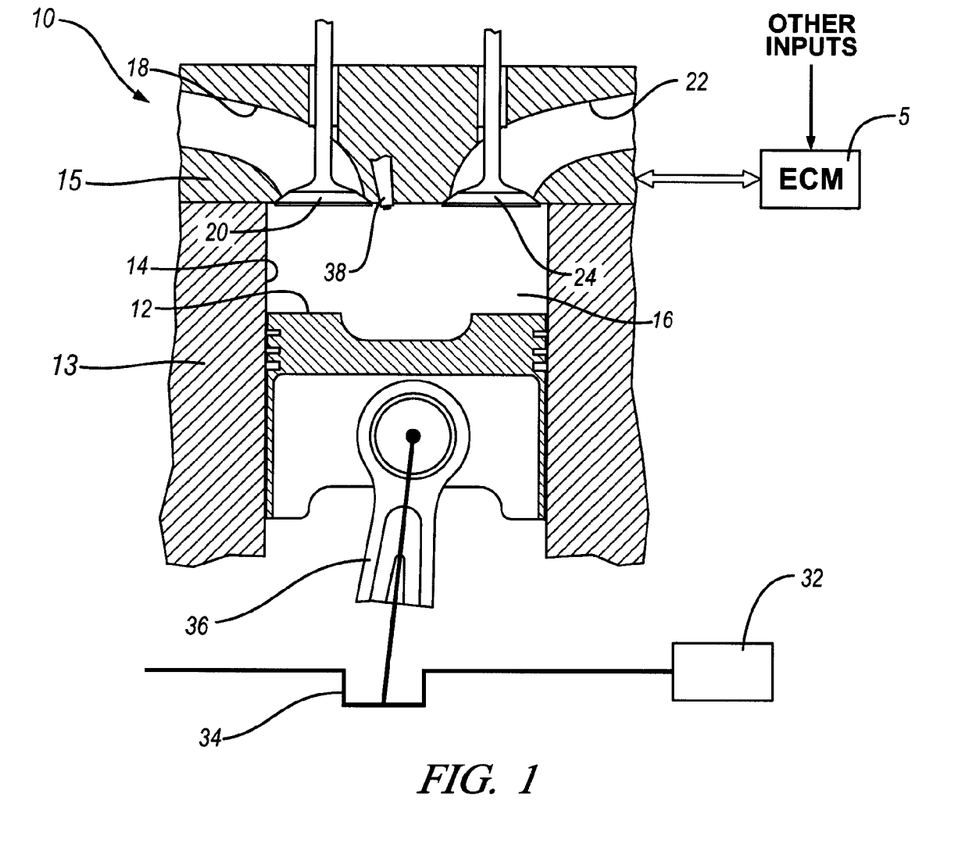
FIG. 1 is a schematic diagram, in accordance with the present invention.

Referring now to the drawings, wherein the showings are for the purpose of illustrating the invention only and not for the purpose of limiting the same, FIG. 1 depicts an internal combustion engine 10 which has been constructed in accordance with an embodiment of the invention. The invention comprises a method and system to manage and control aspects of engine operation and combustion, and therefore control exhaust emissions. The exemplary engine comprises a direct injection, diffusion combustion compression-ignition engine employing a four-stroke operation wherein each engine combustion cycle comprises 720 degrees of angular rotation of a crankshaft divided into four 180-degree stages of intake-compression-expansion-exhaust, which are descriptive of piston movement in each engine cylinder. Diffusion combustion is characterized by combustion of fuel immediately upon injection into a combustion chamber with little or no pre-mixing of the fuel with air in the combustion chamber. The internal combustion engine 10 is operatively coupled with an engine control module (ECM) 5 adapted to execute engine control schemes, based upon operator inputs, ambient conditions, and engine operating conditions.

Referring again to FIG. 1, the exemplary internal combustion engine comprises a multi-cylinder engine, comprising an engine block 13, a cylinder head 15, and a crankshaft 34. A plurality of cylinders 14 is formed in the block, each cylinder 14 containing a piston 12 operative to move linearly therewithin. Each piston 12 is mechanically operatively connected to the crankshaft 34 via a piston rod 36, and the crankshaft is mounted to the engine block 13 on main bearings. A combustion chamber 16 is formed in each cylinder 14 between the top of each piston 12 and the cylinder head 15. The crankshaft 34 rotates at the main bearings, in response to linear force applied thereto by the piston rods 36, as a result of combustion events in the combustion chambers 16. The head 15 contains one or more air inlet ports 18 and intake valves 20, one or more exhaust ports 22 and exhaust valves 24, and a fuel injector 38 operable to deliver fuel directly into the combustion chamber 16. Opening and closing of the intake valves 20 is controlled by a camshaft, the action of which controls inflow of air to the combustion chamber. Opening and closing of the exhaust valves 24 is controlled by a camshaft, the action of which controls exhaust of combustion products out of the combustion chamber. There is a crank sensor 32 located substantially near the crankshaft, operative to generate an electrical signal correlatable to angular position of the crankshaft which is readable by the ECM 5. The crank signal is translated by the ECM to determine crankshaft speed and crankshaft rotational position.

The fuel injector 38 is preferably an element of a common-rail fuel injection system further comprising a high-pressure fuel pump operative to deliver high-pressure (e.g., 1,800 bar/ 180 MPa) fuel to each injector. The fuel injector comprises one of a solenoid-actuated or piezoelectric-actuated device with a nozzle placed through an opening in the cylinder head 15 to inject pressurized fuel into the combustion chamber. The injector nozzle comprises a fuel injector tip characterized by number of openings, spray angle, and flow number, representing a volumetric flow rate at a given pressure. An exemplary fuel injector tip comprises a 7-hole, 158-degree spray angle having a 405 flow number (FN), measured in cc/30-s @ 100 bar. Fuel injector operating characteristics further comprise a minimum controllable flowrate, a maximum flowrate, and a dynamic range, each dependent upon fuel pressure and other parameters. The ECM 5 is operative to individually and selectively control the fuel injectors to inject precise quantities of fuel at specific times during ongoing engine operation. Each fuel injector nozzle includes a flow tip having a plurality of openings through which pressurized fuel is injected into the combustion chamber.

The ECM 5 preferably comprises a central processing unit signally electrically connected to volatile and non-volatile memory devices via data buses. The ECM is signally connected to sensing devices and operatively connected to output devices to monitor and control engine operation and operator inputs. The output devices preferably include subsystems necessary for proper control and operation of the engine, comprising the fuel injection system, and other devices including an exhaust gas recirculation system (not shown). The engine sensing devices include devices operable to monitor engine operation, external conditions, and operator demand, e.g., operator torque requests. Control algorithms are typically executed during preset loop cycles such that each is executed at least once per loop cycle. Loop cycles are executed each 3, 6, 15, 25 and 100 milliseconds for typical engine operation. The description of the ECM 5 and the internal combustion engine is meant to be illustrative, and not restrictive to the invention.

Referring now to FIGS. 2-14, a method for controlling injection of fuel into the combustion chamber 16 of the exemplary engine 10 is detailed. The method comprises determining an engine operating point, typically in terms of engine load, and a quantity of fuel to inject during each combustion cycle, based upon engine operating conditions and the operator torque request. During ongoing engine operation, fuel is injected into the combustion chamber by selectively executing one of one, two, and three fuel injection events during each combustion cycle, based upon the engine operating point, the quantity of fuel to be injected and other factors. There is a single injection event at lower engine loads. There are two, or dual injection events, at moderate engine loads. There are three, or triple injection events at higher engine loads. Dwell times between successive fuel injection events in the same engine cycle are substantially equal, and, quantities of fuel injected during each of the fuel injection events are substantially equal.

Figure 2:
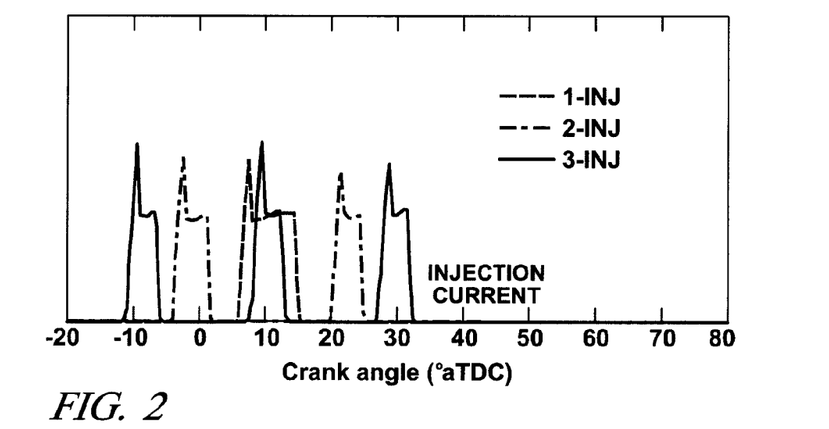
FIG. 2 is a graphical depiction related to engine operation, in accordance with the present invention; and, FIGS. 3-14 are graphical diagrams of quantitative parametric data, in accordance with the present invention.

Referring to FIG. 2, there are graphical depictions of exemplary timing of injections for single (1-INJ), dual (2-INJ), and triple (3-INJ) injection events for delivering the same quantity of fuel at an exemplary operating point of the engine. In this depiction, the exemplary engine is operating at 2115 revolutions per minute (RPM) at a manifold pressure of 214 kPa absolute and a mean effective pressure (BMEP) of 8 bar (800 kPa). The data depicted comprises an undimensioned signal representing electrical current flow to fuel injector 38 as a function of engine crank angle degrees around top-dead-center (CA° aTDC). The single injection operation is intended for use during low-to-moderate engine load conditions, typically less than about 6 bar (600 kPa) BMEP. Single injection comprises a conventional injection event, wherein the entire quantity of fuel scheduled for delivery to the combustion chamber during the engine cycle is injected during a single injection event. The single injection event preferably occurs immediately after top-dead-center (TDC) during the expansion stroke, shown herein starting at about six crank-angle degrees after top-dead-center (6 CA° aTDC) for the specific cylinder. The magnitude of the fuel injection pulsewidth is determined by algorithms resident in the ECM to deliver the requisite quantity of fuel to the combustion chamber based upon a predetermined calibration.

The dual injection operation is primarily intended for use during moderate to medium engine load conditions, in the range of 6 to 12 bar (600 to 1200 kPa) BMEP. Dual injection comprises two injection events wherein half of the quantity of fuel scheduled for delivery to the combustion chamber during the engine cycle is injected during each injection event, with a predetermined dwell time between the two injection events. The dwell time is defined herein as being an elapsed time, in microseconds, between an end of a first injection event and a start of a second injection event for the combustion cycle. The magnitudes of both the first and second fuel injection pulsewidths are determined by algorithms resident in the ECM to deliver the requisite quantity of fuel to the combustion chamber based upon a predetermined calibration. The dual injection event preferably occurs around top-dead-center during the expansion stroke, shown herein with the first injection event beginning at about four crank-angle degrees before top-dead-center (4 CA° bTDC) for the specific cylinder. There is a dwell-time after the end of the first injection, and then the second injection starts, beginning at about 20 CA° aTDC. The dwell time is set at about 1000 microseconds, having been optimized based upon engine cylinder pressure and mass-fraction burned.

The triple injection operation is primarily intended for use during high engine load conditions, in the range of 8 to 16 bar (800 to 1600 kPa) BMEP. Triple injection comprises three injection events wherein a third of the quantity of fuel scheduled for delivery to the combustion chamber during the engine cycle is injected during each injection event, with a predetermined dwell time between the injection events. The triple injection operation is more fully described in co-pending U.S. patent application Ser. No. 11/535,509 filed Sep. 27, 2006, entitled METHOD AND APPARATUS TO CONTROL FUEL INJECTION, which is incorporated by reference herein. The magnitude of each of the first, second, and third fuel injection pulsewidths is determined by algorithms resident in the ECM to deliver the requisite quantity of fuel to the combustion chamber based upon a predetermined calibration. The triple injection event preferably occurs around top-dead-center during the expansion stroke, shown herein with the first injection event beginning at about 12 CA° bTDC) for the specific cylinder. There is a dwell-time after the end of the first injection, and then the second injection starts, beginning at about 8 CA° aTDC. There is a second dwell-time after the end of the second injection, and then the third injection starts, beginning at about 27 CA° aTDC. The dwells times are set at about 1000 microseconds, again having been optimized based upon engine cylinder pressure and mass-fraction burned.

Figure 12:
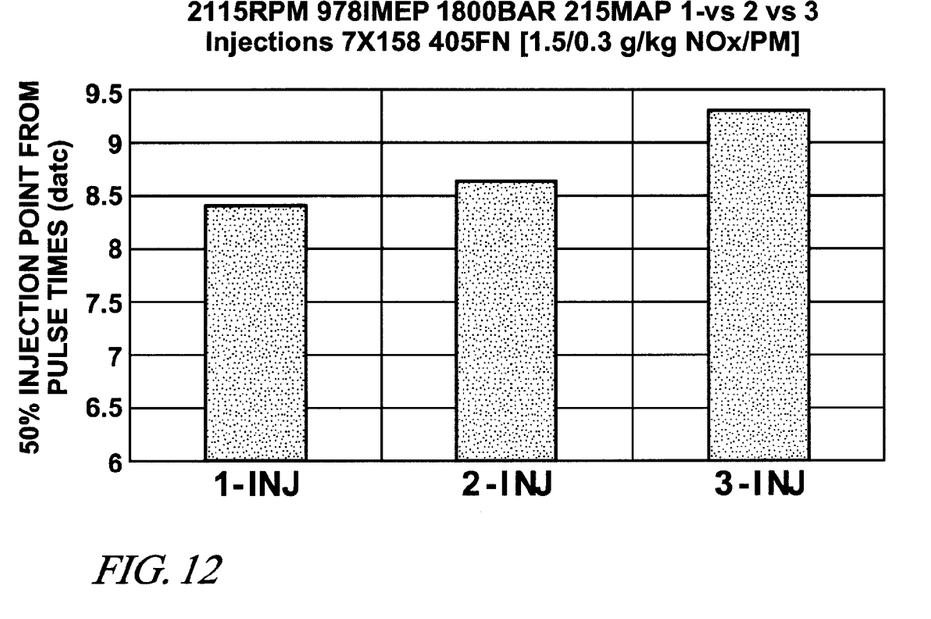

Initiation of the first fuel injection event of both the dual injection and the triple injection is preferably determined based upon a crank angle at which 50% of the quantity of fuel injected during the combustion cycle for the multiple injection events is substantially the same as for the single injection event. Representative data depicting preferred crank angles at which 50% of the fuel has been injected for a specific engine operating point is provided in FIG. 12. Preferred crank angle at which 50% of the fuel has been injected is readily determinable for a single injection event, based upon analytical and empirical data related to operation of a specific engine configuration. A crank angle at which to initiate the first fuel injection event for either of the dual and triple injections can be readily determined by an algorithm resident in the ECM based upon the triple injection event injector pulsewidths for the combustion cycle and the dwell time, with adjustments for lag times related to fuel heat release and other effects. Preferred crank angles at which 50% of the fuel has been injected for a specific engine operating point is provided in FIG. 12, showing the 50% injection point for the triple injection event to lag the 50% injection point for the single injection by about 0.9 crank-angle degrees (CA°).

Referring now to FIGS. 3 through 12, datagraphs are shown depicting various aspects of engine operation for the triple injection as compared to single and dual injection events similarly executed. The datagraphs comprise results obtained from testing conducted on an exemplary direct-injection compression-ignition engine described with reference to FIG. 1, operating under the conditions described hereinbelow. The exemplary engine has further dimensions and operating conditions described with reference to Table 1.

TABLE 1

| Bore | 103 mm |
|---|---|
| Stroke | 99 mm |
| Engine Speed | 2115 RPM |
| IMEP | 978 kPa |
| Manifold Pressure | 215 kPa absolute |
| Fuel Rail Pressure | 1800 bar |
| Injector Tip (# of holes) | 7 quantity |
| Injector Tip Flow Number | 405 cc/30 s @ 100bar |
| NOx Emission Index | 1.5 g/kg fuel |

Figure 3:
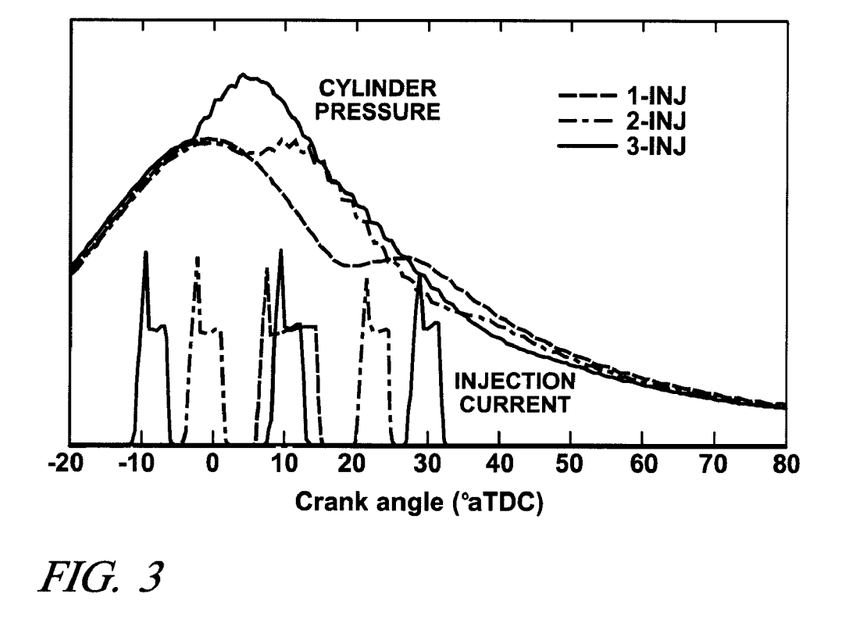
Figure 4:
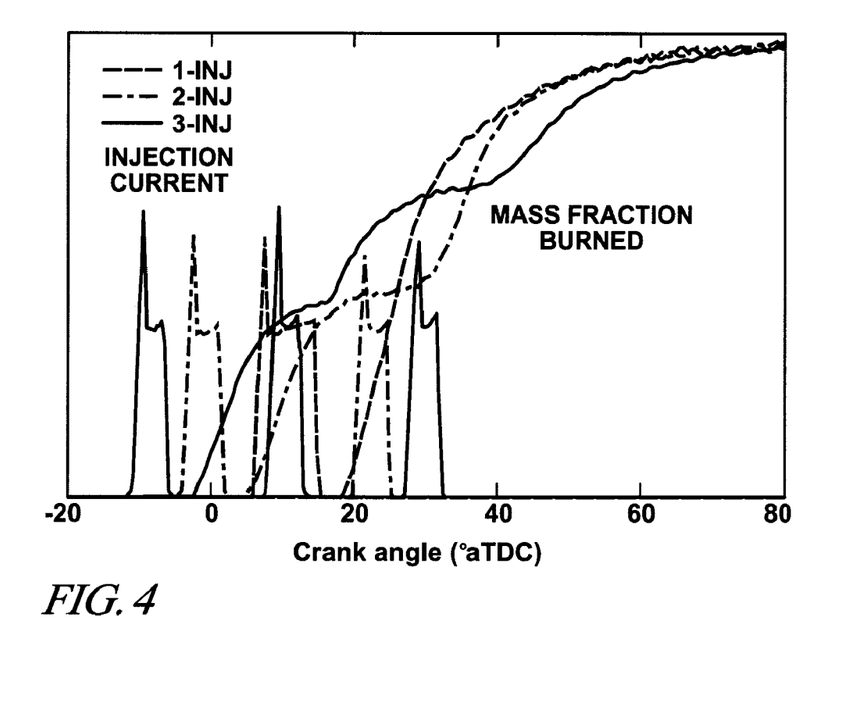

Referring now to FIGS. 3 and 4, exemplary data comprising cylinder pressures and mass fraction of fuel burned are graphically depicted over a pertinent range of engine crank angles during the compression and expansion cycles. The exemplary data depicts results from engine testing at the engine operating condition described with reference to Table 1, with single (1-INJ), dual (2-INJ), and triple (3-INJ) injection events, as shown. In FIG. 3, cylinder pressure traces are depicted for each of the single, dual, and triple injection strategies. In FIG. 4, cumulative mass-fraction of fuel burned is depicted for each of the single, dual, and triple injection strategies. For this comparison, dwell times were held constant at 1000 microseconds, NOx EI was held constant at 1.5-g/kg and PM EI was held constant at a value of 0.3 g/kg. As demonstrated in FIG. 4, the cumulative mass fraction burned traces illustrate distinct phases of combustion for each of the injection strategies. The optimum timing for dual injections results in the two pulses centered about the single injection pulse. Likewise, the optimum for triple injections also results in the three pulses centered about the single injection pulse. The cumulative mass fraction burned curves clearly demonstrates effect of the two and three stages of combustion for dual and triple injection, respectively, compared to the single-injection case.

Figure 5:
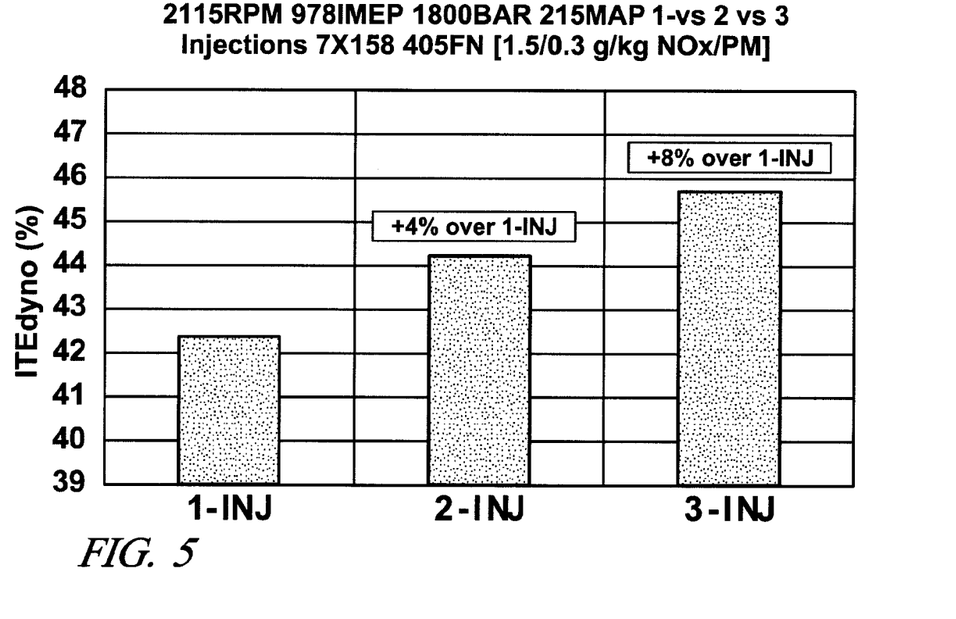
Figure 6:
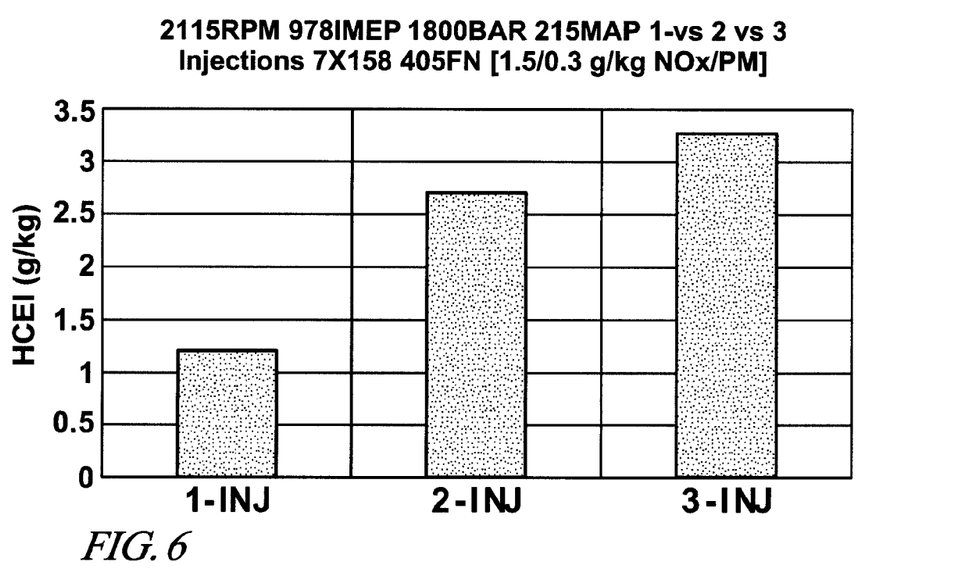
Figure 7:
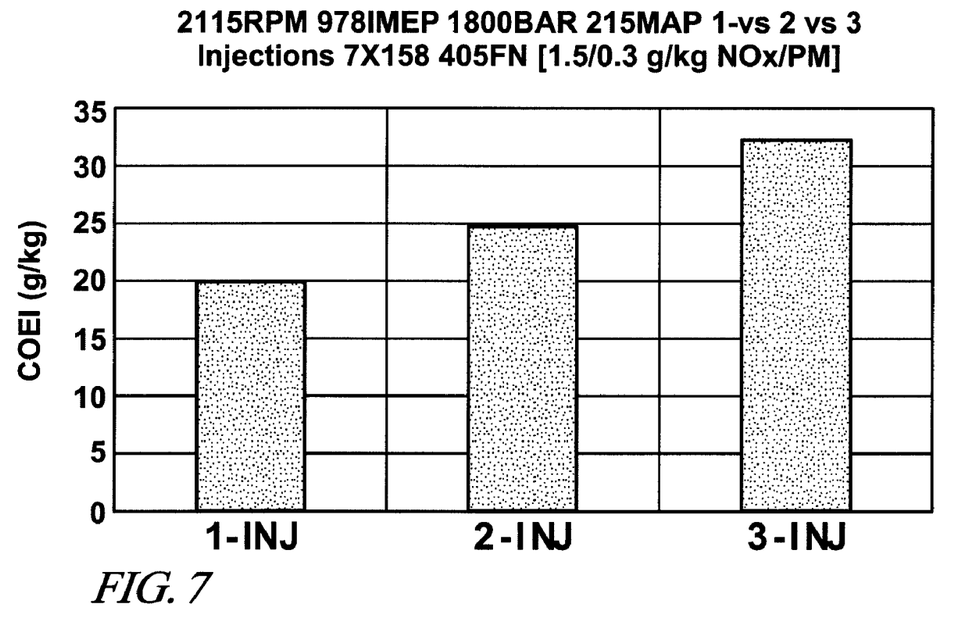
Figure 8:
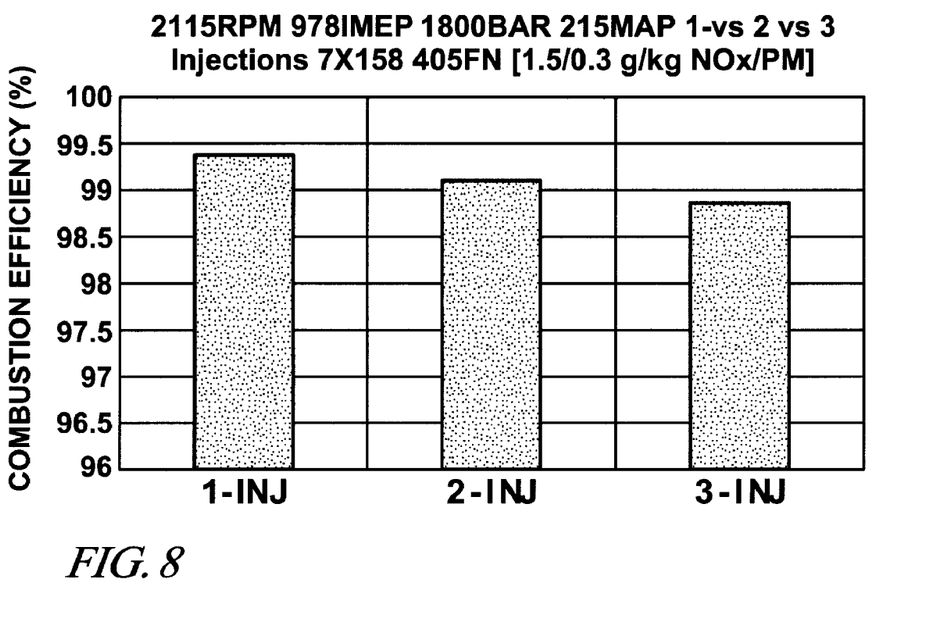
Figure 9:
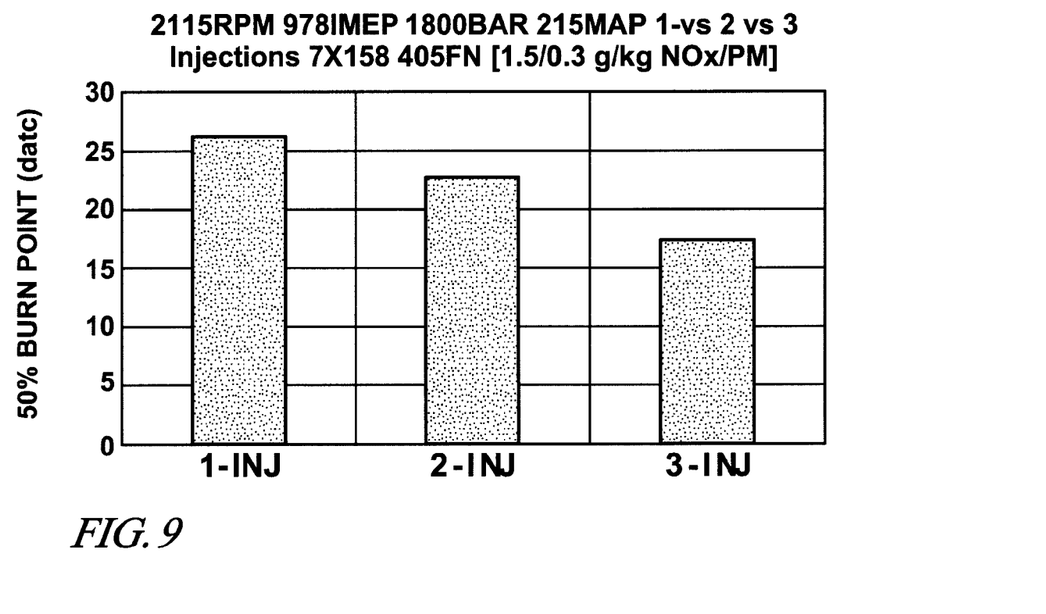
Figure 10:
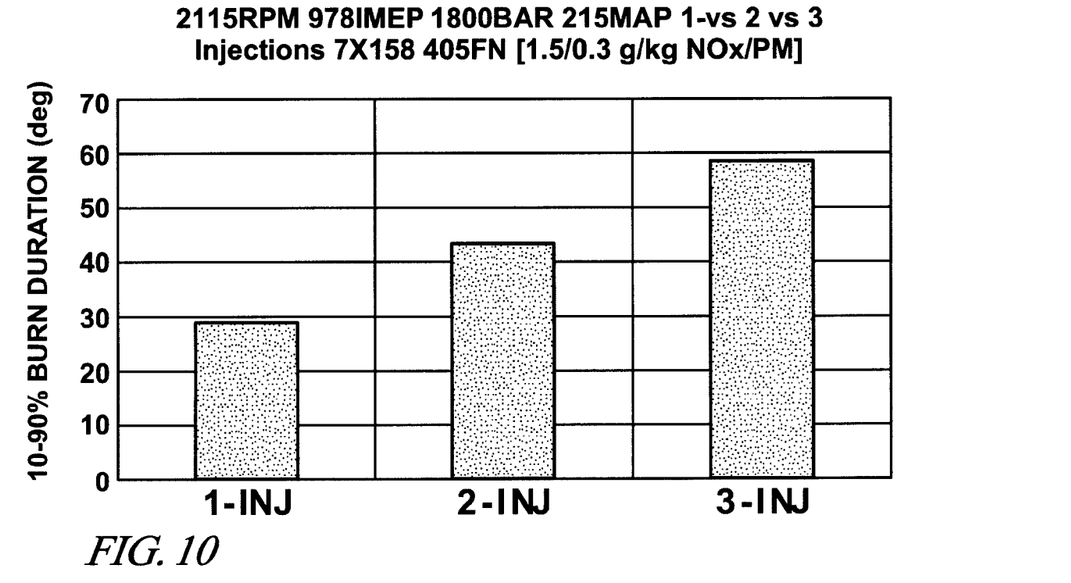
Figure 11:
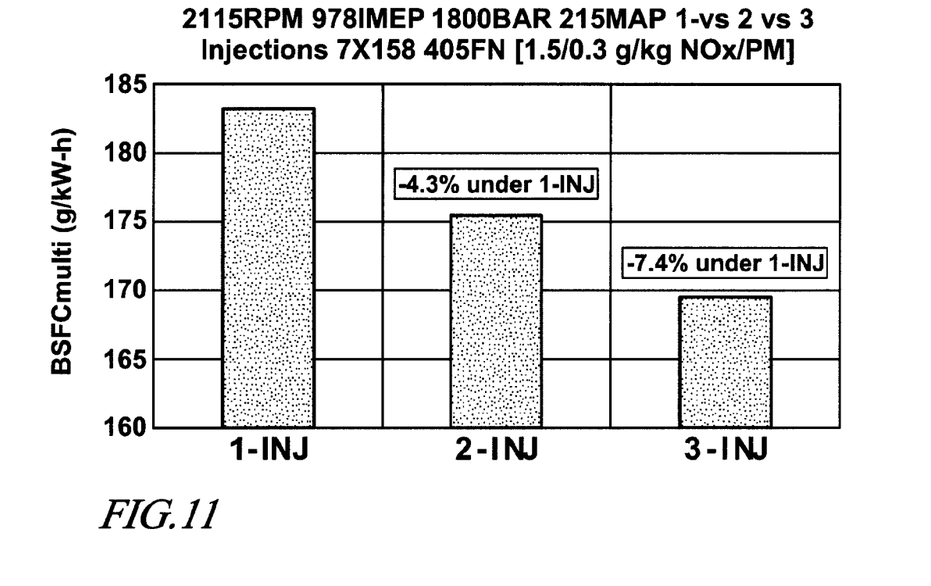

Referring now to FIGS. 5-12, the results demonstrated with reference to FIGS. 3 and 4 are further analyzed. Referring to FIG. 5, the indicated thermal efficiency (ITE) for combustion with single, dual, and triple injection events is shown, and indicates improvements in the indicated thermal efficiency using the triple injection event, as compared to the dual and single-injection combustion at equally low values of NOx and PM emissions, at the specific engine operating point. Dual injection events and corresponding dual-stage burning are shown to have a 4% efficiency advantage over single injection events and single-stage burning. Triple-injection events with triple-stage burning boosts efficiency advantage to about 8% over single-stage burning for the exemplary engine and operating conditions. Referring to FIGS. 6 and 7, HC EI and CO EI emissions increase with increasing stages of combustion, but the magnitudes are small. Furthermore, as shown in FIG. 8, there is a correspondingly minimal effect on combustion efficiency, showing a lowering of the combustion efficiency by a magnitude of about 0.5%. This effect on combustion efficiency is not reflected by engine thermal efficiency or by engine fuel consumption, as demonstrated with reference to FIG. 5 and FIG. 11, respectively. Referring now to FIG. 9, gains in the indicated thermal efficiency from triple-injection as compared to dual-injection and single injection can be attributed to more advanced phasing of combustion, as demonstrated by location of the 50% burn-point, which advances toward top-dead-center with triple injection. For dual-injection operation, the phasing advances about one half ways between the single-injection and triple injection cases. Furthermore, as shown with reference to FIG. 10, the added dwell between injections results in two-stage burning taking longer than single-stage burning, and triple-stage burning taking even longer, as indicated by 10-90% burn duration (measured in ° CA), which increases significantly with the increased stages of burning. Such longer burning durations ultimately limit the efficiency gains. Referring to FIG. 11, brake-specific fuel consumption (BFSC) for the exemplary engine is depicted for operation using single, dual, and triple injection. The engine operating using the triple injection as described herein demonstrates a 7.4% reduction in BFSC, as compared to using the single injection for the same engine operating point.

The dual injection event results in a two-stage combustion event effective to reduce PM emissions, or 'smoke', by limiting combustion temperature rise, and thus limit formation of particulate matter, for the first and second combustion events. As described above, approximately one half of the fuel mass scheduled for delivery is injected in the combustion chamber at or near top dead center on the compression stroke, and after a dwell time, the remaining fuel mass, is injected during the expansion stroke, beginning at a point after top dead center during the expansion stroke, to achieve a second stage of combustion. There are optimal timings and fuel percentages for each injection event to minimize PM while retaining good thermodynamic engine efficiency. When used in combination with significant amounts of recirculated exhaust gas (EGR), substantial reductions in NOx and PM emissions can be achieved compared to single-stage combustion while maintaining good efficiency.

Figure 13:
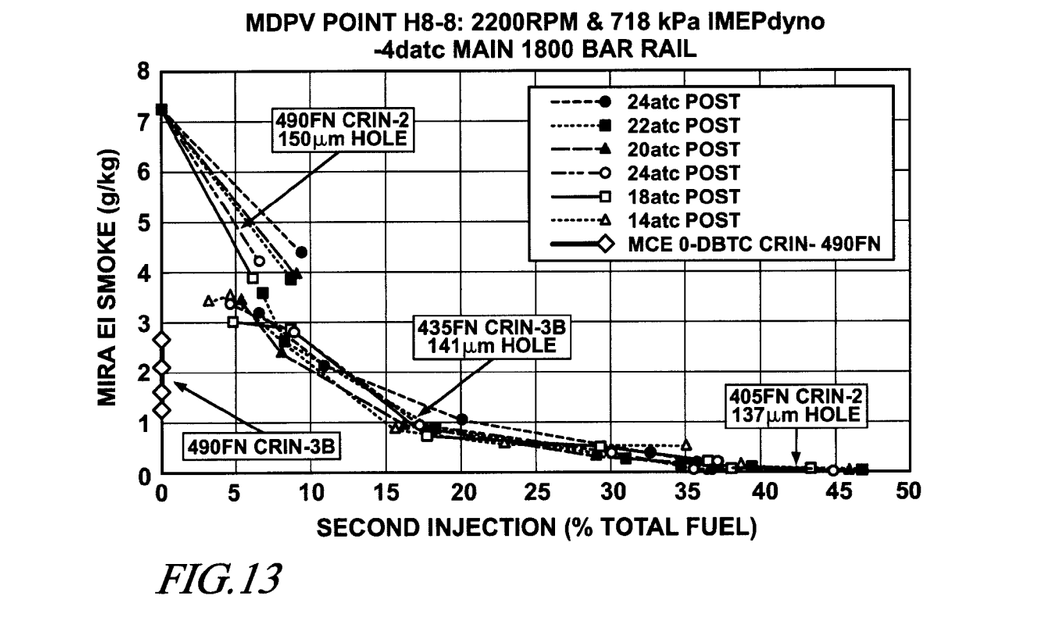
Figure 14:
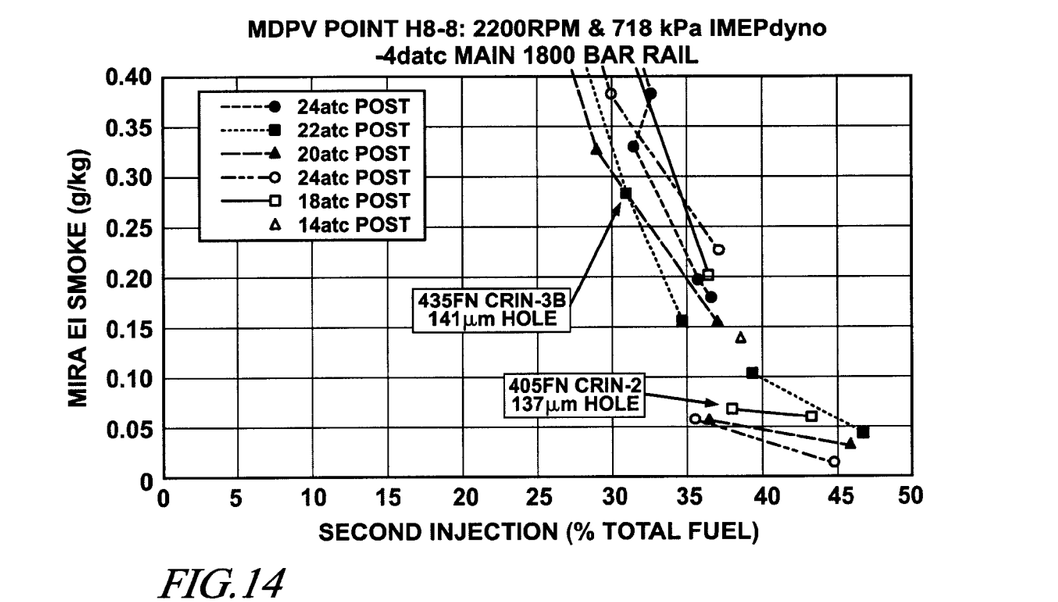

Referring now to FIGS. 13 and 14, datagraphs depict performance effects of varying percentage of fuel injected between the first and second injection events for the dual injection system specifically in terms of particulate matter emissions. The data comprises a measure of particulate matter emission index (EI), in units of g/kg, as measured using a known smoke monitoring device. Engine operation at which the data was gathered was at 2200 RPM, at a load of 718 kPa (or about 8 bar) indicated mean effective pressure (IMEP-dyno), at a fuel rail pressure of 1800 bar, with the first injection event occurring at 4 CA° bTDC, and wherein there was a dwell time, and then a second injection. Testing apparatus included injector flow nozzles of 490 FN with 150 µm (micrometer) hole openings, 435 FN with 141 µm hole openings and 405 FN with 137 µm hole openings. The FN comprises a measure of injector flow in units of cubic centimeters per 30 seconds of flow (cc/30-s). The data demonstrates varying starting times of the second injection event relative to TDC. As the percentage of fuel injection during the second injection event increased from 0%, i.e., a single injection event, to 50%, the PM EI reduced substantially. The benefit derived from delayed burning of the second stage is to limit an increase in cylinder gas temperatures during the expansion stroke, thus limiting formation of particulate matter emissions more effectively as compared to the single injection case. These results demonstrate the effect of reduced nozzle hole diameters (from 150 to 137 μm) on PM emissions, which indicates a reduction in PM emissions due to improved atomization of the fuel prior to combustion. For the exemplary injector having a 7-hole nozzle, the flow number decreased from 490 to 405 cc/30-s with reduced nozzle hole diameters.

Other results (not shown) indicated that more than three injection events during a combustion cycle were not beneficial. The results indicated that the required dwell times between injections lengthens time required for injecting the fuel and lengthens the combustion event excessively, resulting in degraded engine efficiency, when the engine was operated under conditions similar to those described hereinabove.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for controlling fuel injection into a direct injection, compression-ignition engine, comprising:
    determining an engine operating point;
    determining a quantity of fuel to inject during a combustion cycle;
    selectively executing one of one, two, and three fuel injection events during the combustion cycle based upon the engine operating point and the quantity of fuel to inject, and
    selectively executing one of the one, two, and three fuel injection events based upon a minimum controllable flowrate of the fuel injector.

2. The method of claim 1, wherein selectively executing two fuel injection events further comprises injecting substantially equal quantities of fuel during each of the two fuel injection events.

3. The method of claim 1, wherein selectively executing three fuel injection events further comprises injecting substantially equal quantities of fuel during each of the three fuel injection events.

4. The method of claim 3, further comprising: having a first dwell time between an end of the first injection event and a start of the second injection event substantially equal to a second dwell time between an end of the second injection event and a start of the third injection event.

5. The method of claim 4, comprising determining the first and second dwell times to minimize particulate mass emissions and optimize the engine thermal efficiency.

6. The method of claim 5, wherein selectively executing the three fuel injection events further comprises initiating the first fuel injection event during a compression stroke immediately prior to a top-dead-center point of piston travel and initiating the second and third fuel injection events after the top-dead-center point of piston travel.

7. The method of claim 1, wherein the engine operating point is determined based upon engine load.

8. The method of claim 1, comprising determining the quantity of fuel to inject during the combustion cycle based upon the engine operating point and an operator torque request.

9. Method for controlling fuel injection into a direct injection, compression-ignition engine, comprising:
    determining an engine operating point;
    determining a quantity of fuel to inject during a combustion cycle;
    selectively executing two fuel injection events during the combustion cycle based upon the engine operating point and the quantity of fuel to inject and injecting substantially equal quantities of fuel during each of the two fuel injection events, and
    initiating the first fuel injection event at a crank angle determined based upon a crank angle at which fifty percent of the quantity of fuel injected during the combustion cycle for the two fuel injection events is substantially the same as for an optimized single injection event for injecting the quantity of fuel.

10. Method for controlling fuel injection into a direct injection, compression-ignition engine, comprising:
    determining an engine operating point;
    determining a quantity of fuel to inject during a combustion cycle;
    selectively executing one of one, two, and three fuel injection events during the combustion cycle based upon the engine operating point and the quantity of fuel to inject, and
    selectively executing three fuel injection events further comprises injecting substantially equal quantities of fuel during each of the three fuel injection events,
    wherein a crank angle for initiating injection of the first fuel injection event is determined based upon a crank angle at which fifty percent of the quantity of fuel injected during the combustion cycle for the three injection event is substantially the same as for an optimized single injection event for injecting the quantity of fuel.

11. Internal combustion engine, comprising:
    a diffusion-combustion engine equipped with a fuel-injection system comprising a high-pressure fuel system and a plurality of fuel injectors each adapted to inject fuel directly into a combustion chamber of the engine; and,
    a controller, adapted to:
        monitor engine operation and an operator torque request;
        determine a quantity of fuel to inject into one of the combustion chambers during a combustion cycle;
        actuate one of the fuel injectors to selectively execute one of one, two, and three fuel injection events to deliver the determined quantity of fuel to the combustion chamber during the combustion cycle; and,
        initiate the start of injection at a crank angle determined based upon a crank angle at which fifty percent of the quantity of fuel injected during the combustion cycle is substantially the same as for a single injection event to inject the quantity of fuel.

12. The internal combustion engine of claim 11, wherein the diffusion combustion engine comprises a direct injection compression-ignition engine.

13. The internal combustion engine of claim 11, wherein the high-pressure fuel system is effective to operate at a fuel pressure of 1800 bar.

14. The internal combustion engine of claim 11, wherein the controller is adapted to selectively actuate one of the fuel injectors to execute three fuel injection events to deliver the determined quantity of fuel based upon engine load.

15. System to control exhaust gas emissions in a direct-injection, diesel-cycle, internal combustion engine, comprising:
    i) a compression-ignition engine, comprising:
        a) a plurality of cylinders, each cylinder having a combustion chamber formed therewithin;

b) a fuel injection system, comprising a plurality of fuel injectors fluidly connected to a pressurized fuel line; each injector having a plurality of fuel-distributive nozzles having a low flow number, each injector operable to receive pressurized fuel from the fuel rail, and, operable to directly inject a quantifiable mass of fuel into a combustion chamber of the engine; and, ii) a control system: operable to: monitor engine operation, and, control the fuel injection system; the control system having a computer program encoded therein for effecting a method to control operation of the fuel injection system, the method comprising:

injecting a first mass of fuel immediately prior to the piston reaching a top-dead center location in the combustion chamber during a compression stroke; and, injecting a second mass of fuel substantially equal to the first mass of fuel into the combustion chamber during an expansion stroke occurring immediately thereafter, after a predetermined dwell period.

* * * * *